United States Patent [19]

Banta et al.

[11] Patent Number: 4,481,313

[45] Date of Patent: Nov. 6, 1984

[54] PROCESS FOR INSTANTANEOUS PEPTIZATION OF CHLOROPRENE-SULFUR COPOLYMERS

[75] Inventors: Edward M. Banta, Baytown; Kenneth D. Fitzgerald, Sugarland, both of Tex.

[73] Assignee: Denka Chemical Corporation, Houston, Tex.

[21] Appl. No.: 447,206

[22] Filed: Dec. 6, 1982

[51] Int. Cl.$^3$ ............... C08L 45/00; C08L 47/00
[52] U.S. Cl. ................... 524/84; 524/457; 524/609; 526/234; 528/389; 528/487
[58] Field of Search ......... 528/491, 492, 389, 487; 524/84, 457; 526/234

[56] References Cited

U.S. PATENT DOCUMENTS

| | | | |
|---|---|---|---|
| B. 324,505 | 1/1975 | Doyle et al. | 260/29.7 SQ |
| 2,234,215 | 3/1941 | Youker | 260/89 |
| 2,264,173 | 11/1941 | Collins | 260/32 |
| 2,567,117 | 9/1951 | Mochel | 526/224 |
| 2,888,444 | 5/1959 | Roberts et al. | 524/256 OR |
| 2,952,650 | 5/1957 | Wood | 524/71 |
| 3,310,544 | 3/1967 | Aho | 260/92.3 |
| 3,920,623 | 11/1975 | Khan | 260/92.3 |
| 3,984,609 | 10/1976 | Branlard et al. | 526/78 |
| 4,255,539 | 3/1981 | Branlard et al. | 525/330 |
| 4,303,765 | 12/1981 | Musch et al. | 525/343 |
| 4,367,594 | 1/1983 | Murray, Jr. | 33/181 R |

FOREIGN PATENT DOCUMENTS

| | | |
|---|---|---|
| 916929 | 5/1968 | United Kingdom . |
| 1547957 | 7/1979 | United Kingdom . |

Primary Examiner—John Kight
Assistant Examiner—Garnette D. Draper
Attorney, Agent, or Firm—Kenneth H. Johnson

[57] ABSTRACT

A process for instantaneous peptization of chloroprene-sulfur copolymer comprising contacting a latex of said copolymer with a peptization system comprising tetraethyl thiuram disulfide and mercaptobenzothiazole.

22 Claims, No Drawings

PROCESS FOR INSTANTANEOUS PEPTIZATION OF CHLOROPRENE-SULFUR COPOLYMERS

BACKGROUND OF THE INVENTION

1. Field of the Invention

This invention relates to viscosity stable chloroprene-sulfur copolymers.

2. Related Art

"Sulfur modified" neoprenes (so called, but such compositions are in fact copolymers of chloroprene and sulfur) have had and continue to have wide commercial success. The copolymers are prepared by polymerizing chloroprene in an aqueous emulsion in the presence of sulfur as widely described in the art, for example, Whitby, "Synthetic Rubber", 1954, page 770. The chloroprene is polymerized with sulfide linkages in the polymer chains. The product is a high molecular weight, high viscosity polymer, which would not be tractable in ordinary rubber milling and processing equipment.

Generally the product rubber is subjected to a procedure to cause scission of the long molecular chains at the sulfide linkages to reduce the molecular weight of the rubber and produce rubber of the desired viscosity. The process of chain scission has been called "plasticizing" at times, however, it is believed the more appropriate term is peptization.

Tetraethyl thiuram disulfide (TETDS) is the principal peptizing agent and it causes the desired scission of the polymer chains at the sulfide linkages, however, TETDS peptization has always been a delicate and troublesome procedure and various means have been devised to eliminate problems associated therewith.

One aspect of peptization with TETDS is the provision of a sufficient period of time for the peptization to occur, usually 4 to 20 hours. In addition, the peptized chloroprene/sulfur comonomers often exhibited viscosity instability on storage. The presence of a small amount of residual TETDS in the rubber after peptization, which serves as a processing aid, may continue to cause peptization. Dithiocarbamate is frequently added to speed peptization.

U.S. patent application B 324,505 (Trial Voluntary Protest Program) discloses that improved peptizations, i.e. good rate and stable product, can be achieved by utilizing the dithiocarbamate to TETDS at a substantially constant ratio regardless of the degree of peptization desired.

However, the difficulties so long associated with TETDS and the real lack of solution thereto has given impetus to development of alternate peptization methods avoiding the effective but troublesome TETDS. U.S. Pat. No. 3,920,623 discloses a peptization system of benzothiazole sulfenamide and dialkyl xanthogen disulfides, alkyl xanthic acid salts or dialkyl-dithiocarbonic acid salts, carried out at 10°–50° C. for 1 to 24 hours, wherein TETDS is avoided as detracting from the properties of the "Vulcanizates".

Another alternative method of peptization is disclosed in U.S. Pat. No. 4,303,765 where chloroprene-sulfur copolymers are peptized with specified polysulfides.

U.S. Pat. No. 3,984,609 discloses sulfur modified polychloroprene, obtained by polymerizing chloroprene in the presence of sulfur and either a dialkyl xanthogen disulfide or iodoform, can be instantaneously peptized with a class of thiol compounds including mercaptobenzothiazole or its sodium salt at pH of at least 9.

The present invention has established that mercaptobenzothiazole or its soluble salts have no effect on chain scission (peptization) of chloroprene-sulfur copolymer, however, in combination with TETDS, instantaneous peptization is obtained, in a highly reproducible manner to produce a rubber with excellent Mooney viscosity stability and some improved properties in cured products.

SUMMARY OF THE INVENTION

One aspect of the present invention is in a process for making chloroprene-sulfur copolymer, which comprises polymerizing chloroprene monomer in an alkaline aqueous emulsion in the presence of elemental sulfur and a free radical polymerization catalyst in the absence of modifying agents to form a chloroprene polymer latex, wherein the improvement comprises contacting the latex with a peptization system comprising tetraethyl thiuram disulfide and mercaptobenzothiazole or the water soluble salts thereof.

Another aspect of the present invention is a process for the instantaneous peptization of chloroprene-sulfur copolymers, comprising polymerizing chloroprene monomer in the presence of elemental sulfur and in the absence of modifying agents and peptizing the latex by contacting the latex with a peptization system comprising tetraethyl thiuram disulfide and mercaptobenzothiazole or the water soluble salts thereof. (Soluble salts, for example, include the sodium salt, ammonium salt, potassium salt and the like.)

A further aspect of the present invention is a method for the instantaneous peptization of a latex of chloroprene-sulfur copolymer having unpeptized sulfide linkages therein and produced by the polymerization of chloroprene monomer and sulfur in the absence of modifying agents comprising contacting said latex with a peptization system comprising tetraethyl thiuram disulfide and mercaptobenzothiazole.

The peptization is instantaneous, that is, the peptization occurs immediately in the presence of both components of the peptization system and is independent of temperature in the general range of 5° C. to 80° C. and pH.

The mercaptobenzothiazole (MBT) alone has no apparent effect on the sulfur linkages in the rubber, nor any other effect that has been observed, however, when both MBT and TETDS are present with chloroprene-sulfur copolymer, the rubber is peptized immediately and substantially to very nearly complete extent (the high degree of peptization is evidenced by the excellent stability exhibited by the peptized material on aging, since residual TETDS in the rubber will cause a continuing peptization of the product.)

The two components of the peptizing system MBT and TETDS may be added to the latex in any order or simultaneously, however, they may not be mixed. It is desirable to add both components after the reaction has been short stopped.

It is an interesting aspect of the present invention that the beneficial peptization and viscosity stabilization can be obtained by adding MBT (TETDS, if necessary) to chloroprene-sulfur latex previously peptized, acidified, and in storage. This technique has been applied to rubber treated by conventional TETDS peptization in storage for such a period of time as to become unstable. It is in this regard that the effectiveness of the MBT- TETDS peptization in acid systems, e.g., pH 5.6, has been shown.

Combinations of from about 0.25 to about 2.5 parts by weight per 100 parts of monomer (The terms "monomer" or "polymerizable compounds" as used herein include the organic compounds, but exclude sulfur even though it does enter into the polymer chain.) of TETDS and from about 0.10 to 2.0 parts by weight per 100 parts of monomer (polymerizable monomer originally present) of MBT have been found effective for the present instantaneous peptizations, however, the preferred ranges of these components on the same basis is about 0.5 to 2 parts by weight TETDS and about 0.25 to 1.5 part by weight MBT, and more preferably about 0.5 to 1 part by weight MBT. Amounts outside of these ranges can also be used. Since the peptization is instantaneous and more complete than conventional TETDS peptization, residual TETDS and/or MBT in the latex does not have the marked detrimental effect on storage stability which has been a problem in the past, however, the processing aid provided and expected by fabricators from residual TETDS is still present.

Another aspect of the present invention, a peptization system for peptizing chloroprene-sulfur comonomer comprising TETDS and MBT, preferably in the weight ratio of TETDS:MBT of 1:0.1 to 6 and more preferably 1:025 to 2.

The relative proportions of TETDS and MBT within the ranges provided can be adjusted in order to optimize or vary the properties exhibited by the cured rubber, for example, increasing amounts of MBT improve flex resistance but reduce modulus. Thus the operator can select the amount of MBT, which will provide the rubber characteristic desired. These variations are easily and routinely determined by the operator prior to preparation of a commercial batch.

The polymerization of chloroprene and sulfur is preferably carried out in the absence of modifying agents, sometimes called chain transfer agents. The modifying agents, serve during the polymerization to terminate the propagation of polymer chains and usually produce a polymer of sufficiently low viscosity, that peptization is not necessary. Such rubbers have different characteristics from the peptized rubbers prepared by copolymerizing only sulfur and chloroprene. The modifiers are well known and include mercaptans, xanthogens, polysulfides and iodoform. It is possible to carry out the polymerizations, wherein the polysulfides are present, for longer periods of time and thereby produce higher molecular weight copolymers which can be peptized, however, no advantage is gained by that approach, and it is preferably to exclude modifying agents from the polymerization according to present invention, since they are not needed in the present instantaneous peptizations. However, such modifier containing chloroprene-sulfur copolymers can be peptized according to present invention, since the modifiers do not interfere with the peptization.

DETAILED DESCRIPTION OF THE INVENTION AND SPECIFIC EMBODIMENTS

The polymerization is entirely conventional for producing the chloroprene-sulfur copolymers. The term "polymers of chloroprene" or "chloroprene-sulfur copolymers" encompasses polymers in which chloroprene is the major or predominant monomer. Organic comonomers may also be employed such as 2,3-dichloro-1,3-butadiene; acrylonitrile, methyl methacrylate and so forth. Usually, the total amount of comonomers will represent no greater than 25 mole percent of the total monomers and preferably will constitute less than 15 mole percent of the total monomers including chloroprene. The term "chloroprene monomer" as used is understood to include all polymerizable monomer excluding sulfur, generally at least 50 mole percent chloroprene, preferably less than 25 mole percent comonomer and more preferably less than 15 mole percent comonomer.

The polymerization of chloroprene in aqueous emulsion is well known and any such system which does not interfere with the novel characteristics of this invention can be employed. Processes and methods for the polymerization and recovery of chloroprene are disclosed, for example, in the "Encyclopedia of Polymer Science and Technology," Vol. 3, page 705–730 (Interscience, 1965), and in numerous patents such as U.S. Pat. Nos. 2,264,173 and 2,264,191 both issued on Nov. 25, 1941 and Whitby, supra. The polymerization may be conducted either batchwise or continuously.

Conventional emulsifiers may be employed such as the salts of rosins and rosin derivatives such as tall oil rosin (or resin), wood rosin, disproportionated rosins and salts thereof. Rosin base emulsifiers are well known to the art. A particularly preferred rosin emulsifier is wood rosin (unmodified except for clean-up and sold by the Reichhold Chemicals as Nancy-Wood Rosin).

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha-azo-bis-iosbutyronitrile and the like. Suitable inorganic peroxides are salts of inorganic per acids including persulfates, perborates or percarbonates, e.g., ammonium or potassium persulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of monomeric material and emulsifying agent and water. The proportions not critical but generally the monomer will be present in an amount such as from 30 to 60 percent by weight based on the total weight of the composition.

The polymerization is carried out in the presence of elemental sulfur to produce a chloroprene-sulfur copolymer. Any form of sulfur may be used but a form which is soluble in the polymerizable compounds (monomer) is preferred, for example, ordinary rhombic sulfur. It may be dissolved in the polymerizable compounds before their emulsification or may be introduced into them by any other suitable means. When high proportions of sulfur are desired, it is advantageous to dissolve the sulfur in a solvent such as carbon disulfide or a highly chlorinated naphthalene. The sulfur may also be added to the water phase in the form of an aqueous dispersion, provided the conditions are such that a substantial amount of the sulfur dissolves in the chloroprene before the polymerization begins.

Amounts of sulfur as low as 0.1% or less based on polymerizable compounds (monomer) may be used up to the maximum proportion soluble in the non-aqueous phase under the conditions of the polymerization, ordinarily about 0.2 to 2.5%, preferably in the range of 0.2 to 0.8 parts of sulfur per 100 parts of monomer, more preferably 0.3 to 0.65 parts thereof.

The number of sulfide linkages incorporated in the polymer, will, generally, be proportional to the amount of sulfur present in the polymerization system and the number of interlinear sulfide linkages will determine the degree to which the molecular weight can be decreased by scission of the sulfide linkages with the peptizing agent.

The polymerization reaction is normally short-stopped at less than complete conversion of all of the chloroprene monomer, e.g., 68 to 74 % conversion using conventional short stops such as phenothiazine, hindered phenols, aralkyl derivatives thereof and phenolic antioxidants such as hydroquinone, 2,5-di-tert-amylhydroquinone, 4-tert-butyl-pyrocatechol, 4,4'-thiobis(6-tert-butyl-o-cresol) and 2,6-di-tert-butyl-4-phenylphenol.

TETDS or MBT can be added concurrently with the short stop solution. One component of the present peptizing system can also be added to the polymerization in with the short stop (however, both may not be present therein prior to contact with the polymerization), thereby completely eliminating that period of time which is related to the peptization step in conventional peptizations.

The latex is then stripped of unreacted chloroprene monomer, for example, using steam in a turbannular flow as well known in the art as described in U.S. Pat. No. 2,467,769.

Normally the stripped latex is acidified and it may be stored in that form or the rubber isolated, for example, by continuously freezing a thin layer of the latex as known in the art and described in U.S. Pat. No. 2,187,146 followed by washing and drying the resultant polymer film.

Chloroprene-sulfur copolymers prepared according to this invention exhibit resistance to polymer viscosity changes during storage as latex and in solid polymer state. The polymers exhibit outstanding vulcanized properties such as flex and heat resistance and superior tensile properties, tear strength and compression set.

The following examples are presented to illustrate the invention and are not intended to limit the scope thereof. In the examples parts and percents are by weight unless otherwise specified. The parts by weight in the specification and claims are based on original monomer present in the polymerization unless specified otherwise.

EXAMPLE 1

Chloroprene was polymerized in an aqueous alkaline emulsion. The reaction components are made up as follows:

| | Parts, by weight |
|---|---|
| Monomer Phase | |
| Chloroprene | 100.0 |
| Sulfur | 0.34 |
| Wood Rosin | 4.5 |
| Aqueous Phase | |
| Deoxygenated Water | 107.0 |
| Sodium Hydroxide | 0.7 |
| Salt of a Naphthalene Sulphonic Acid/ Formaldehyde Condensation Product | 0.7 |

The emulsion was purged with nitrogen, heated to 47° C. in a nitrogen blanked glass reactor, and polymerization started by the addition of a small quantity of an aqueous solution of 5% potassium persulfate and 0.25% sodium anthraquinone sulfonate. During the polymerization reaction, more persulfate solution was introduced at such a rate that the temperature of the emulsion does not exceed 47° C.

After approximately 70% of the chloroprene has been converted to polymer, in about 2.5 hours, the polymerization is stopped by the addition of an aqueous emulsion of a chloroprene solution (8.5 parts water, 6.5 parts chloroprene) of 0.05 parts of phenylthiazine and 1.2 parts of tetraethylthiuram disulfide stabilized with 0.15 parts sodium lauryl sulfate and 0.05 parts of the sodium salt of a condensate of formaldehyde with naphthalene sulfonic acid. A 12.5% aqueous solution of the sodium salt of mercaptobenzothiazole (0.6 parts) was added to the emulsion to initiate instant peptization.

The latex was cooled to 25° C. and chloroprene was stripped from the polymerized emulsion using steam in a turbannular flow as described in U.S. Pat. No. 2,467,769.

The stripped latex was acidified to a pH of 5.6 with 15% acetic acid and the polymer is isolated from a portion of the latex by continuously freezing a thin layer of the latex as described in the U.S. Pat. No. 2,187,146 and washing and drying the resulting polymer film. The rubber film has a Mooney viscosity (ML 1+4) of 49.

EXAMPLE 2

The sulfur modified polychloroprene latex is prepared as in Example 1 and instantaneously peptized with tetraethylthiuram disulfide and various levels of sodium mercaptobenzothiazole. The following Mooney viscosities are obtained for the peptized latex:

| Sample | Tetraethylthiuram Disulfide Parts* | NaMBT Parts* | Mooney Viscosity (ML 1 + 4) |
|---|---|---|---|
| A | — | 0.5 | 177 |
| B | 1.20 | .4 | 53.5 |
| C | 1.20 | .5 | 47.5 |
| D | 1.20 | .6 | 44.0 |
| E | 1.20 | .8 | 42.0 |
| F | 1.20 | 1.0 | 39.5 |

*Based on original monomer in polymerization

EXAMPLE 3

A latex prepared in accordance with Example 1 is instantaneous peptized at different pH values using 0.6 parts sodium MBT and 1.20 parts tetraethylthiuram disulfide. The following viscosities (ML 1+4) are obtained:

| Sample | pH of Latex Emulsions | Mooney Viscosity (ML 1 + 4) |
|---|---|---|
| G | 12.2 | 53.5 |
| H | 11.5 | 55.0 |

-continued

| Sample | pH of Latex Emulsions | Mooney Viscosity (ML 1 + 4) |
|---|---|---|
| I | 10.2 | 51.5 |

EXAMPLE 4

A sulfur modified polychloroprene latex produced in the same way as described in Example 1 is aged for fifty hours after stripping the unreacted chloroprene monomer and Mooney viscosity determined on the aged latex emulsion.

| Sample | Latex Emulsion Temperature, °C. | Hours Emulsion Aged | Mooney Viscosity (ML 1 + 4) |
|---|---|---|---|
| J | 25 | 3 | 54.5 |
| K | 25 | 25 | 53.0 |
| L | 25 | 50 | 52.0 |

EXAMPLE 5-9

The sulfur modified polychloroprene latex was polymerized, instantaneously peptized in the aqueous emulsion system, stripped of unreacted monomer, isolated, washed, and dried according to Example 1. The isolated rubber sample is compounded using the following recipe:

|  | Parts by Weight |
|---|---|
| Polymer | 100.0 |
| Octylated Diphenylamine | 2.0 |
| Magnesia | 4.0 |
| Stearic Acid | 0.5 |
| Carbon black, N660 | 29.0 |
| Zinc Oxide | 5.0 |

Samples of the compounded stock are vulcanized in a mold under pressure for 10 minutes at 153° C. This compound is formulated to illustrate those properties originally given in the absence of any organic accelerator.

Tear strength is measured by ASTM Method D624-37 and is reported as pounds force/inch.

Flex resistance is measured by ASTM Method D1052-55 and is reported as number of cycles required for the cut length to increase 500 percent.

Tensile properties are measured by ASTM Method D412-75.

Hot compression set is measured by ASTM Method D395-69 Method B using a heat treatment of 70 hours at 212° F.

Cold compression is measured by Method D 395-56 Method B using a heat treatment of 22 hours at 14° F.

Table I shows the results of testing the vulcanization with various levels of NaMBT in the peptization process.

TABLE I

| Example | 5 | 6 | 7 | 8 | 9 |
|---|---|---|---|---|---|
| Parts NaMBT parts | 0.25 | 0.5 | 0.75 | 1.0 | 1.5 |
| Mooney Viscosity, Ml 1 + 2½-4 | | | | | |
| Original | 79/72 | 58/53.5 | 51/47 | 49/44.5 | 43/39.5 |
| Aged 3 days @ 50° C. | 80/73 | 59/54 | 53/49 | 50/46 | 69.5/67 |
| Aged 7 days @ 50° C. | 81/73 | 60/56 | 54/50 | 58/54 | 80/82 |
| Aged 10 days @ 50° C. | 82.5/75 | 62/58 | 56.5/52 | 64.5/61 | 90/92 |
| Compression Set: | | | | | |
| 70 hrs. @ 212° F. | 42.5 | 44.0 | 46.6 | 50.4 | 57.2 |
| 22 hrs. @ 14° F. | 29.4 | 33.9 | 31.4 | 29.1 | 35.2 |
| Tensile Properties: | | | | | |
| 300% modulus, psi | 1430 | 1390 | 1420 | 1350 | 1200 |
| Tensile Strength, psi | 3365 | 3310 | 3465 | 3340 | 3335 |
| Tear Strength, Die C, psi | 310 | 355 | 340 | 350 | 360 |
| Flex Resistance (Cycles to failure × 1000) | 605 | 840 | 964 | 1165 | >1500 |

The invention claimed is:

1. A peptization composition for peptizing chloroprene-sulfur copolymers comprising a latex of chloroprene-sulfur copolymers, tetraethyl thiuram disulfide and water soluble salt of mercaptobenzothiazole.

2. The peptization composition according to claim 1 wherein the weight ratio of tetraethyl thiuram disulfide: water soluble salt of mercaptobenzothiazole is about 1:0.1 to 6.

3. The peptization composition according to claim 2 wherein the weight ratio of tetraethyl thiuram disulfide: water soluble salt of mercaptobenzothiazole is about 1:0.25 to 2.

4. In the process for making chloroprene-sulfur copolymer comprising polymerizing chloroprene monomer in an alkaline aqueous emulsion in the presence of elemental sulfur and a free radial polymerization catalyst to form a chloroprene-sulfur copolymer latex, wherein the improvement comprises contacting the latex with a peptization system comprising tetraethyl thiuram disulfide and water soluble salt of mercaptobenzothiazole.

5. The process according to claim 4 wherein said peptization system comprises from about 0.25 to about 2.5 parts by weight tetraethyl thiuram disulfide per 100 parts of monomer and from about 0.25 to about 1.5 parts by weight of water soluble salt of mercaptobenzothiazole per 100 parts of monomer.

6. The process according to claim 5 wherein said peptization system comprises from about 0.5 to 2 parts weight tetraethyl thiuram disulfide and from about 0.5 to 1 part by weight water soluble salt mercaptobenzothiazole.

7. The process according to claim 6 wherein from about 0.2 to 2.5 wt. % of said elemental sulfur is present based on monomer.

8. The process according to claim 7 wherein from 0.2 to 0.8 wt. % of said elemental sulfur is present based on monomer.

9. The process according to claim 8 wherein from 0.3 to 0.65 wt. % of said elemental sulfur is present based on monomer.

10. A process for the instantaneous peptization of chloroprene-sulfur copolymer latex comprising contacting said latex with a peptization system comprising tetraethyl thiuram disulfide and water soluble salt of mercaptobenzothiazole.

11. The process according to claim 10 said copolymers contains from about 0.2 to 2.5 wt. % elemental sulfur therein based on monomer.

12. The process according to claim 11 wherein said copolymer contains from 0.2 to 0.8 wt. % elemental sulfur therein based on monomer.

13. The process according to claim 12 wherein said copolymer contains from 0.3 to 0.65 wt. % elemental sulfur therein based on monomer.

14. The process according to claim 11 wherein said peptization system comprises from about 0.25 to about 2.5 parts by weight tetraethyl thiuram disulfide per 100 parts of monomer and from about 0.25 to 1.5 parts by weight of water soluble salt of mercaptobenzothiazole per 100 parts of monomer.

15. The process according to claim 14 wherein said peptization system comprises from about 0.5 to 2 parts by weight tetraethyl thiuram disulfide and from about 0.5 to 1 part by weight water soluble salt of mercaptobenzothiazole.

16. The process according to claim 4 or 10 wherein said polymerization is carried out in the absence of modifying agents.

17. A process for the instantaneous peptization of chloroprene-sulfur copolymer comprising polymerizing chloroprene monomer in the presence of elemental sulfur in an alkaline aqueous emulsion system to form a latex of said copolymer, contacting said latex with tetraethyl thiuram disulfide and thereafter contacting said latex with a solution of soluble salt of mercaptobenzothiazole.

18. The process according to claim 17 wherein said solution contains sodium mercaptobenzothiazole.

19. The process according to claim 1 wherein said water soluble salt is sodium mercaptobenzothiazole.

20. The process according to claim 4 wherein said water soluble salt is sodium mercaptobenzothiazole.

21. The process according to claim 10 wherein said water soluble salt is sodium mercaptobenzothiazole.

22. The process according to claim 17 wherein said polymerization is carried out in the absence of modifying agents.

* * * * *